(12) United States Patent
Wrobel, Jr.

(10) Patent No.: US 11,582,352 B2
(45) Date of Patent: *Feb. 14, 2023

(54) APPARATUS AND METHOD FOR USING AN INTELLIGENT NETWORK FOR ANALYZING AN EVENT EXTERNAL TO A SIGNALING NETWORK

(71) Applicant: Leo Anthony Wrobel, Jr., Ovilla, TX (US)

(72) Inventor: Leo Anthony Wrobel, Jr., Ovilla, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/074,374

(22) Filed: Oct. 19, 2020

(65) Prior Publication Data
US 2021/0037143 A1 Feb. 4, 2021

Related U.S. Application Data

(63) Continuation of application No. 16/278,467, filed on Feb. 18, 2019, now Pat. No. 10,812,663.
(Continued)

(51) Int. Cl.
*H04W 68/00* (2009.01)
*H04M 15/00* (2006.01)
(Continued)

(52) U.S. Cl.
CPC ....... *H04M 15/90* (2013.01); *H04M 3/42348* (2013.01); *H04W 4/025* (2013.01);
(Continued)

(58) Field of Classification Search
CPC ......... H04W 4/90; H04W 4/029; H04W 4/02; H04W 64/00; H04W 4/023; H04W 76/50; H04W 40/20; H04W 40/244; H04W 4/021; H04W 4/025; H04W 4/14; H04W 92/18; H04W 4/06; H04W 4/80; H04W 84/12; H04W 4/40; H04W 4/44; H04W 8/20; H04W 4/00; H04W 4/027; H04W 12/04; H04W 4/08; H04W 4/024; H04W 4/12; H04W 4/20; H04W 4/33; H04W 4/48; H04W 4/50; H04W 68/00; H04W 12/72;
(Continued)

(56) References Cited

U.S. PATENT DOCUMENTS 8,032,118 B1 * 10/2011 Othmer ............ H04M 3/53358
455/412.2
10,812,663 B2 * 10/2020 Wrobel, Jr. ......... H04M 7/1265
(Continued)

*Primary Examiner* — Quan M Hua
(74) *Attorney, Agent, or Firm* — L. Bruce Terry

(57) ABSTRACT

A system and method in an intelligent network are provided for analyzing an event external to the intelligent network. A set of intelligent network subscribers is selected in a selected geographic area. Next, signal message data is obtained from a signaling network in the intelligent network, wherein the signal message data indicates status of subscribers in the set of intelligent network subscribers. External data related to the selected geographic area is obtained, wherein the external data is external to the intelligent network. The signal message data and the external data are then fused to produce synthetic data. In response to the synthetic data, an alert of an external event is produced. The alert can be graphically represented on a display.

21 Claims, 4 Drawing Sheets

Related U.S. Application Data

(60) Provisional application No. 62/638,111, filed on Mar. 3, 2018.

(51) Int. Cl.
    *H04W 4/90*         (2018.01)
    *H04W 76/50*       (2018.01)
    *H04W 4/02*         (2018.01)
    *H04M 3/42*         (2006.01)
    *H04W 24/08*       (2009.01)

(52) U.S. Cl.
    CPC .............. *H04W 4/90* (2018.02); *H04W 24/08* (2013.01); *H04W 76/50* (2018.02)

(58) Field of Classification Search
    CPC ... H04W 48/16; H04W 4/16; H04M 2242/04; H04M 3/5116; H04M 11/04; H04M 2203/2016; H04M 1/72457; H04M 1/72418; H04M 2242/30; H04M 11/045; H04M 3/465
    See application file for complete search history.

(56) References Cited

U.S. PATENT DOCUMENTS

| | | | |
|---|---|---|---|
| 2005/0003797 A1* | 1/2005 | Baldwin | H04W 76/50 455/404.1 |
| 2012/0196556 A1* | 8/2012 | Perrott | G08B 27/001 455/404.1 |
| 2013/0040619 A1* | 2/2013 | Grube | H04L 51/222 455/414.1 |
| 2016/0284038 A1* | 9/2016 | Johnson | G16H 50/00 |
| 2019/0141003 A1* | 5/2019 | Cottle | H04L 67/18 |

* cited by examiner

APPARATUS AND METHOD FOR USING AN INTELLIGENT NETWORK FOR ANALYZING AN EVENT EXTERNAL TO A SIGNALING NETWORK

CROSS-REFERENCE TO RELATED APPLICATION

This application is a continuation of U.S. patent application Ser. No. 16/278,467, filed Feb. 18, 2019, which application claims the benefit of U.S. Provisional Patent Application No. 62/638,111, filed Mar. 3, 2018, both of which are incorporated by reference herein in their entirety.

TECHNICAL FIELD

The disclosed embodiments relate generally to network devices and network device operation, and more particularly to analyzing events that are external to a signaling network.

BACKGROUND OF THE INVENTION

In a telecommunications network, such as the Public Switched Telephone Network (PSTN), the components of the network can indicate (i.e., signal) certain information to each other to coordinate the components for providing services, which services can include setting up voice and data connections. Signaling in the art of telephony includes the exchange of control and/or status information associated with the setup and release of a telephone call in a telecommunications network. Examples of control or signaling information include information representing the digits dialed by the caller, information representing the caller's billing number, and information representing status of the line associated with the called number.

One technique for transmitting signaling messages is common-channel signaling (which may also be known as non-facility associated signaling (NFAS)), which uses a separate dedicated data channel to carry signaling information in the form of short packets of data rather than carry signaling information in the voice or "payload" section of the facility. An example of common-channel signaling is the widely used standard for common-channel signaling in the telephone system known as Signaling System Seven (SS7). Common-channel signaling functions include the exchange of information (other than by speech) specifically concerned with the establishment, release, and other control of calls, and network management, in automatic telecommunications operation. SS7 can be thought of as a data network that controls or manages the voice network. SS7 can be used in implementing an Intelligent Network, where the logic for making a call (i.e., making a network connection, which more broadly can include a connection for communicating voice, data, multimedia, or the like) is separate from the switching equipment and call paths that carry the payload of the call.

Signaling messages in an intelligent network can also be transmitted using Session Initiation Protocol (SIP). SIP is a signaling protocol used to set up Voice over Internet Protocol (VoIP, Voice over IP) connections. The most common use of SIP is for setting up and tearing down voice and video calls, such as those made over the Internet. SIP is commonly used along side SS7 in many applications. SIP uses a request-response model, so each SIP transaction consists of a client request, followed by at least one server response. Q.931 is a standard signaling protocol for the ISDN communications used in VoIP promulgated by the International Telecommunication Union (ITU) Telecommunication Standardization Sector (ITU-T). The Q.931 protocol is involved in setting up, transmitting and receiving call signaling messages and terminating call connections. Q.931 is part of the VoIP H.323 protocol stack, used to manage ISDN connection control signaling.

Thus, SS7 effectively separates signaling from the voice circuits. An SS7 network must be made up of SS7-capable equipment from end-to-end in order to provide its full functionality. The network can include signaling node equipment, which may be one of three types, including Service Switching Points (SSPs), Signal Transfer Points (STPs), and Service Control Points (SCPs). Several communication link types (labeled as A, B, C, D, E, and F) can be used to interconnect the node equipment.

In many industries, government, and non-government organizations, it can be beneficial to have near real-time notice of events occurring in a region in order to gauge their impact on people. Governmental and non-governmental organizations can use early detection of events affecting public safety and wellbeing to marshal and deploy resources efficiently in order to help people in need, possibly saving lives and property. Industry managers can also have an economic interest in predicting, detecting, analyzing, and responding to events in a region in order to serve and gauge the response of customers to an event affecting their business. Such events can be unknown by traditional operation of the signaling network, thus these events may be referred to as an external event to the signaling network.

In view of the structure and operation of the intelligent network, an improved apparatus and method for detecting or analyzing an event that is external to a signaling network of the intelligent network is disclosed. It is in view of this background information related to the design and use of a signaling network of the intelligent network that the significant improvements of the present disclosure have evolved.

BRIEF DESCRIPTION OF THE DRAWINGS

For a better understanding of the embodiments disclosed herein, as well as additional embodiments thereof, reference should be made to the Detailed Description below, in conjunction with the following drawings in which like reference numerals refer to corresponding parts throughout the figures.

DETAILED DESCRIPTION

Figure 1:
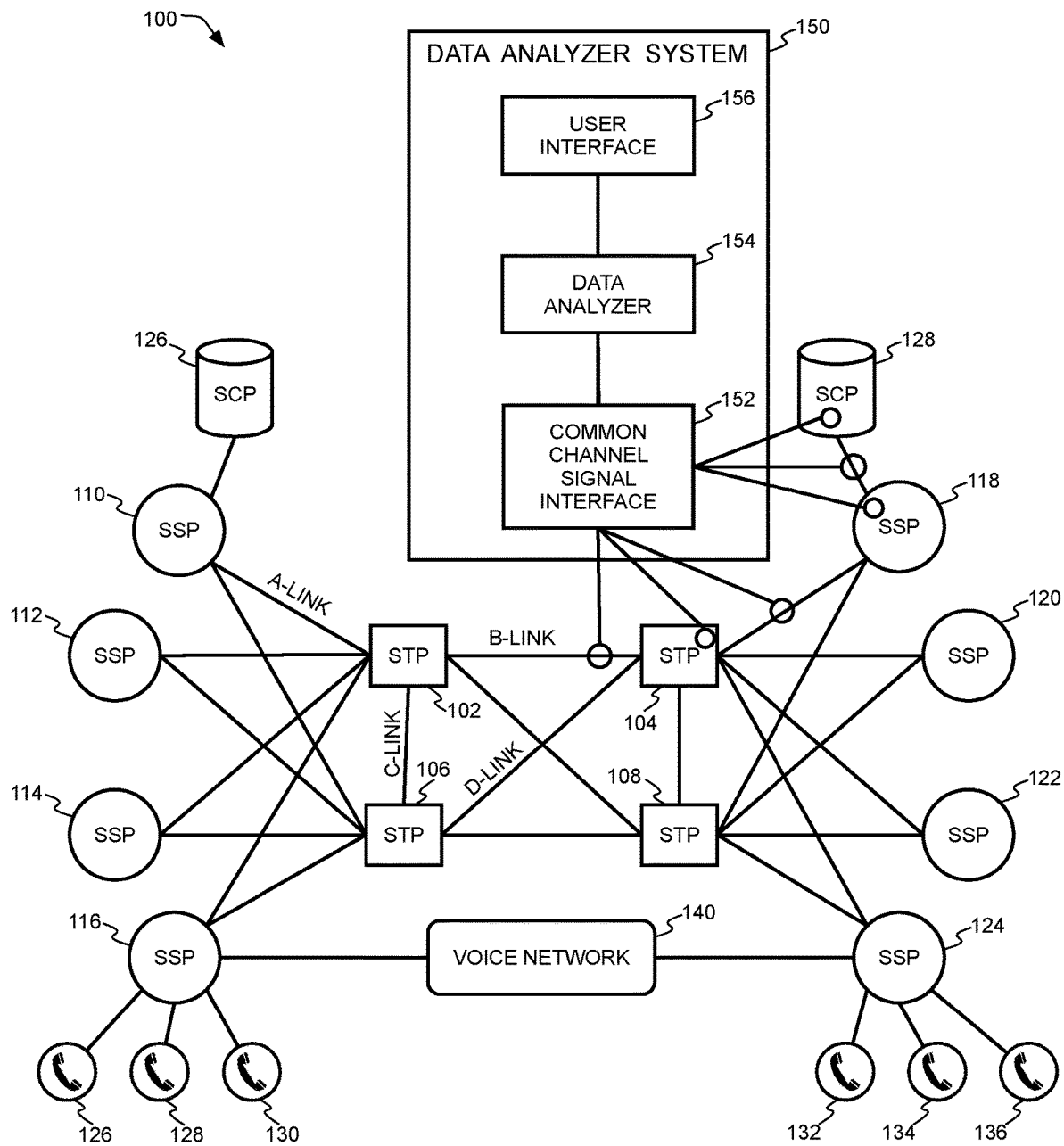
FIG. 1 illustrates a high-level block diagram of an SS7 network in accordance with an embodiment of the disclosure.

An embodiment of the present disclosure advantageously provides an apparatus and a method in a signaling network for detecting or analyzing an event external to the signaling network. The disclosure generally relates to an intelligent network, such as the Public Switched Telephone Network.

For simplicity and clarity of illustration, reference numerals may be repeated among the figures to indicate corresponding or analogous elements. Numerous details are set forth to provide an understanding of the embodiments described herein. Some embodiments may be practiced without these details. In other instances, well-known methods, procedures, and components have not been described in detail to avoid obscuring the embodiments described. The description should not be considered as limited to the scope of the embodiments described herein.

Referring first to FIG. 1, there is depicted a high-level block diagram of a Signaling System 7 (SS7) network, which is set forth as an example of a common-channel signaling network, in accordance with an embodiment of the disclosure. As illustrated, SS7 system network 100 (i.e., an NFAS) usually includes three types of signal nodes, including, but not necessarily limited to, signaling transfer points (STPs) 102 through 108, signal switching points (SSPs) 110 through 124, and signal control points (SCPs) 126 and 128.

Signal switching points (e.g., SSPs 110-124) can be telephone switches (e.g., end offices or tandems) equipped with SS7-capable software and terminating signaling links. SSPs 110-124 can each be connected to a plurality of subscribers (wire-line or wireless), such as illustrated in FIG. 1 by subscribers 126 through 136, which are connected to signal switching points 116 and 124, respectively. SSP's 110 through 124 can be implemented with telecommunications switches known as telephone exchanges, local switches, or central offices, which are the parts of the telecommunications system that connects to each system subscriber or telephone. SSP's can originate, terminate, or switch calls, wherein calls are connected between subscribers through voice network 140.

Signal transfer points (e.g., STPs 102-108) are the packet switches of the SS7 network. They receive and route incoming signaling messages towards the proper destination, typically using point codes as an address of the destinations. STPs are often deployed in mated pairs, such as STP 102 and 106, and STP 104 and 108. Mated pairs work redundantly to perform the same logical function. STP's can receive and route incoming signaling messages to the proper destination, or perform specialized routing functions.

Signal control points (SCPs) 126 and 128 can provide databases that store and implement data management of information necessary for advanced call-processing capabilities, functions, and features of the intelligent network. These advanced capabilities can determine other numbers and features that are associated with a particular call, such as rerouting a call to a call forwarding number.

Signaling System 7 (SS7) has evolved into a robust and reliable worldwide standard, and it is used to set up and tear down most of the world's Public Switched Telephone Network (PSTN) telephone calls. SS7 uses NFAS, also known as out-of-band signaling, which means that signaling or control information (i.e., signal message data) travels on a separate dedicated communication channel, rather than within the same communication channel as the telephone call. Using SS7, telephone calls can be set up more efficiently, and services such as call forwarding, or wireless roaming, are easier to implement and manage.

The SS7 channel or data path utilizes a level 4 data protocol designed specifically for SS7 networks. Integrated Services Digital Network User Part (ISUP) is the data standard used for controlling calls. Communicating ISUP data enables the feature richness of an intelligent network using SS7. The SS7 network is capable of generating calls and generating queries regarding the status of condition of a wireline or wireless communications system without disturbing or interrupting subscribers or end users in any way, and without monitoring the content communicated over the connection between subscribers. The SS7 network (and other similar NSAF or common-channel networks) communicates signal message data, wherein signal message data includes all data, commands, controls, and the like, available for request, transmission, or transferring over the SS7 network (i.e., the common-channel network). Signal message data is communicated in accordance with the standards specifying communications on the common-channel network. Signal message data can include cause codes, point codes (i.e., network addresses of network devices), and data available over the SS7 network, which may include general location of subscribers or specific location of subscribers. Such location data may be available through, for example, locations associated with point codes, or by requesting location information from a mobile system or a mobile subscriber.

SS7 links can be communication channels that are used in the SS7 system to transfer telephone system data and control messages (i.e., signal message data). Several different types of SS7 links (such as links "A" through "F") may be used in an SS7 system. In FIG. 1, an "A" link, or access link, can connect SSPs to STPs (e.g., the A link between STP 102 and SSP 110), or connect STPs to SCPs. A "B" link, or bridge link, can be used to connect paired STPs to other paired STPs (e.g., the B link between STP 102 and STP 104). A "C" link, or cross link, can be used to connect paired STPs (e.g., the C link between STP 102 and STP 106). "D" links, or diagonal links, can be used to connect paired STPs at one level in the hierarchy to paired STPs at another level in the hierarchy (e.g., the D link between STP 102 and STP 108). "E" links, or extended links, can be used to connect SSPs to alternate or remote STPs (not shown in FIG. 1) for increased resilience and load sharing. "F" links, or fully associated links, can be used to connect SSPs when significant traffic flows between them (not shown in FIG. 1).

In accordance with this disclosure, FIG. 1 also includes data analyzer system 150, which is used to collect and analyze data and signal messages, along with external data, to produce an alert in response to detecting or analyzing an external event that is external to the intelligent network. Data analyzer system 150 can include multiple components, which can control the overall operation of data analyzer system 150 using various combinations of hardware, software, and firmware. An external event may be considered an event that is not comprehended by, or not within, the intelligent network alone. For example, the intelligent network may be able to comprehend that a communication link has failed, but would not comprehend that such failure may be part of an external event such as a vehicle accident event or a weather damage event.

Data analyzer system 150 shown in FIG. 1 can include common-channel signal interface 152, data analyzer 154, and user interface 156. Note that data analyzer system 150, or selected components thereof, need not be co-located in a particular location or facility; parts of data analyzer system 150, such as user interface 156, may be remotely located and coupled through an Internet connection.

Common-channel signal interface 152 can be implemented with an SS7 signal analyzer, such as the SS7 signal analyzer sold by INET Company under the trade name Spectra, or the SS7 signal analyzer sold by The Hewlett-Packard Company under the trade name HP 3700B, HP3700C, or HP3700D. Common-channel signal interface 152 can be any device that provides a physical, and logical, connection to the SS7 network for gathering status information associated with selected subscribers. Such status information associated with selected subscribers can be collected by passively monitoring signal message data associated with the selected subscribers, or by actively polling the selected subscribers for signal message data that indicates their status.

Although common-channel signal interface 152 is shown in FIG. 1 coupled to the SS7 network with several different communication links, only one such link is necessary. Since signal message data can freely traverse the SS7 network, the location of common-channel signal interface 152 may have multiple available options. In some embodiments, the speed of communication links connecting SS7 signal nodes may be a consideration in the location of common-channel signal interface 152. Common-channel signal interface 152 can be connected at any SS7 point in the diagram, whether between signal nodes (operating without interfering with signal message traffic), or located within (e.g., inside the premises of, or inside the equipment of) an SCP, SSP, or STP signal node.

Communication links with common-channel signal interface 152 can use a level 4 data protocol designed specifically for SS7 networks. Integrated services digital network user part (ISUP) is the data standard used for controlling calls, and is capable of generating queries, or requests for status, on a wireline or wireless subscriber without disturbing (e.g., ringing) the subscriber.

While the embodiment shown in FIG. 1 is implemented in the PSTN, other embodiments of the disclosure may be implemented in another network that uses a configuration with a common channel, or networks that use NSAF or other out-of-band signaling on a separate data channel.

Figure 2:
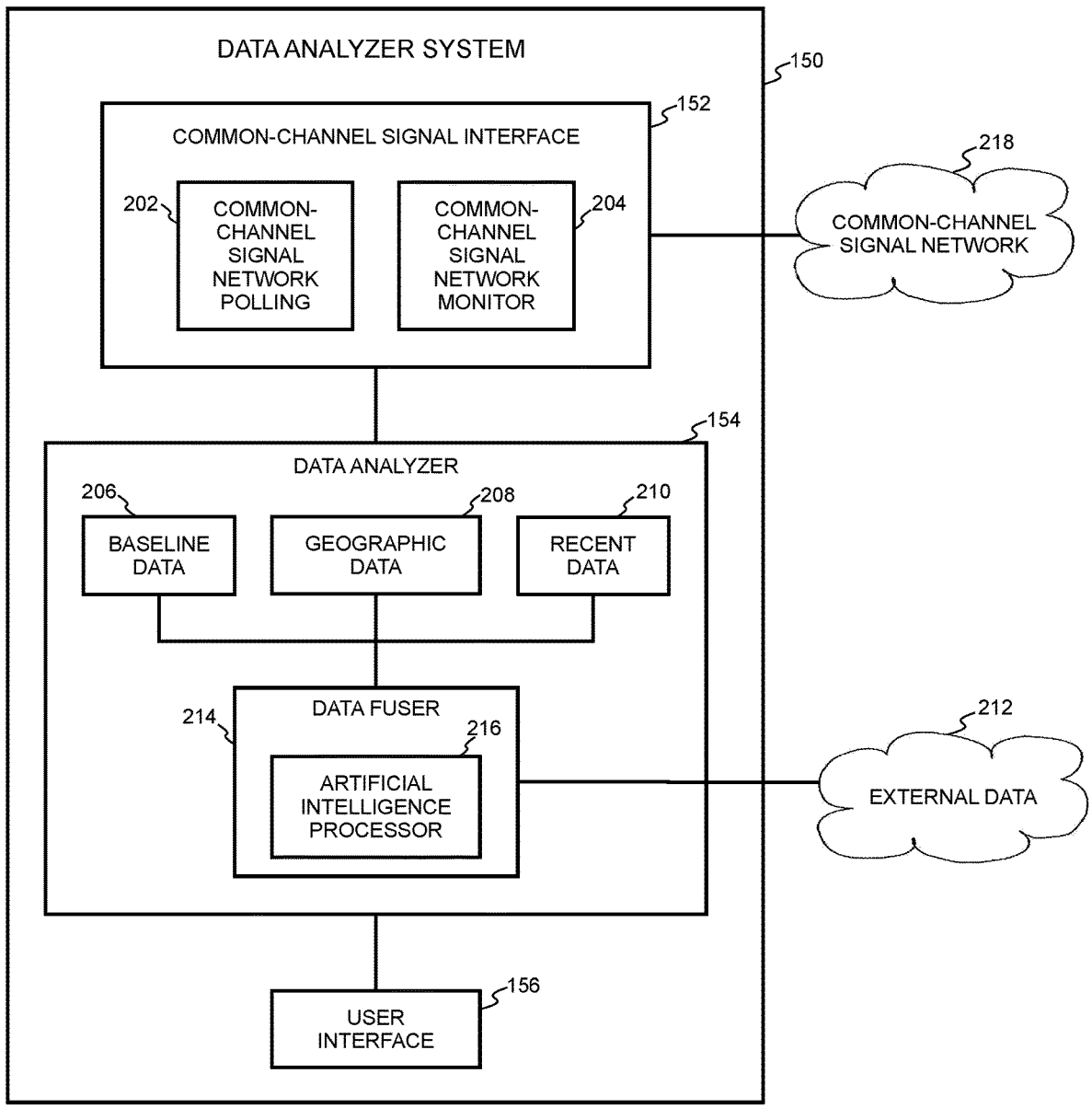
FIG. 2 depicts a high-level block diagram of a data analyzer system, shown in FIG. 1.

Referring now to FIG. 2, there is depicted a high-level block diagram of a data analyzer system, such as data analyzer system 150 shown in FIG. 1. Data analyzer system 150 can include components for communicating with the common-channel signal network, analyzing data obtained from the common-channel signal network, and interfacing requests for analysis, and results of analysis, with the system user.

As illustrated at common-channel signal interface 152, the interface can be implemented in some embodiments with a polling function, such as common-channel signal network polling 202. In other embodiments, common-channel signal interface 152 can be implemented with a monitoring function (e.g., a more passive, observation function), such as common-channel signal network monitor 204. In yet another embodiment, both network polling and network monitoring functions implemented with devices, methods, and software, can be used together to gather, or obtain, signal message data from the signaling network, wherein the signal message data indicates the status of selected subscribers.

Common-channel signal interface 152 is coupled to common-channel signal network 218 by hardware and software means that permits communication with common-channel signal network 218. Thus, it can be useful to connect to common-channel signal network 218 within the facility of, for example, STP 102, or SSP 110, or SCP 126, or other similar facilities with messaging access, such as a service provider to the SS7 network.

In one embodiment, common-channel single interface 152 can communicate using standard protocols, such as Integrated Services Digital Network (ISDN) bearer channels, and Integrated Services Digital Network User Part (ISUP), which are level 4, out-of-band protocols for data and signaling messages that control calls and features in the SS7 network.

As an example of polling for signal message data, common-channel signal interface 152 can generate an SS7 message that represents a request to make a call using common-channel signal network polling function 202, which is similar to a message generated in response to a subscriber initiating a call by dialing another subscriber. In response to the request to make a call, common-channel signal interface 152 can receive signal message data containing status information, which may be known as "cause codes," indicating the status of the called subscriber. The status of the called subscriber can indicate the subscriber is busy, idle, malfunctioning, or other status allowed by specified cause codes. As an example, such cause codes may be those specified by the International Telecommunications Union: Telecommunication Standardization Sector (ITU-T) as part of the Q.76x series of specifications.

In one embodiment, user interface 156 can communicate data and commands with common-channel signal interface 152 for obtaining signal message data indicating status of subscribers in a set of selected subscribers. User interface 156 can also be used to display output, such as graphical representations of an alert of a detected external event.

Data analyzer 154 can include various databases and data engines, such as baseline data 206, geographic data 208, and recent data 210. Baseline data 206 can store data describing baseline operating parameters and characteristics of the SS7 network, which can be useful for identifying operational anomalies in the network. Examples of baseline data 206 can include: normal daily call volumes by number of calls, normal daily call volumes by duration of calls, normal daily call volumes by origination of calls, normal daily call volumes by destination of calls, percentage of calls originated or terminated to wireless or landline customers, and the like.

Geographic data 208 can store data describing the location of subscriber units, or other network equipment. This geographic data can be used in selecting a set of intelligent network subscribers in a geographic area. As an example with non-mobile subscribers, geographic data 208 can associate subscribers with a general or specific location, such as a subscriber's association with a particular network exchange, or an association with a particular emergency 911-call center. Geographic data 208 can, for example, include "point codes" associated with the geographic coordinates of network equipment. Examples of geographic data with respect to mobile subscribers can, for example, include a general location of the subscriber as being within the coverage area of a wireless cell, or a specific location of the mobile subscriber obtained by location finding circuits (e.g., a GPS device) in the subscriber unit.

Recent data 210 can store data describing more recent operating parameters and characteristics of the SS7 network, such as data related to network operation in a relatively recent, sliding window of time compared to baseline data 206. Examples of recent data 210 can include, for example, data showing a spike or a dip in call usage compared to normal daily call volumes by number of calls, normal daily call volumes by duration of calls, normal daily call volumes by origination of calls, normal daily call volumes by destination of calls, and the like. When baseline data 206 and recent data 210 are processed together, spikes, dips, and other anomalies within the SS7 system can be detected and analyzed.

Data fuser 214 can be used to analyze, or combine, signal message data, which is data internal to the common-channel network, and data external to the common-channel network to produce synthetic data. Data external to the network can be obtained from remote data 212, which can be any data accessible by an external network, a cloud service, or an Internet connection. Processing within data fuser 214 can be implemented or supplemented by artificial intelligence processor 216. Artificial intelligence processor 216 can be used to fuse data having different data types (e.g., disparate data) in order to come to a useful conclusion, such as an alert to a predicted or probable external event that is external to the common-channel network.

Data external to the network can be defined as data that is not created by the intelligence of the SS7 network, or data commonly used by the SS7 network. Data created by the SS7 network can include a set of data collected by monitoring or polling for signal message data, such as cause codes. External data can be data not supported by the function, the protocol, or the cause code messaging data of the common-channel network 218. An example of external data is weather related data, which is data not available within the common-channel network. Other examples of external data are name and billing addresses of subscribers, traffic data, seismic data, and the like. Many forms of external data have a geographic component, in that the external data can be related to status or activity in a geographic location. Examples of external geographic data can include: geographic coordinates of a subscriber unit using a geographic coordinate system (e.g., vertical and horizontal coordinates), phone number(s) of subscriber unit (s) at a geographic coordinate (where the phone number may include a Numbering Plan Area Code/Central office (exchange) code, or NPA/NXX) in accordance with a subscriber numbering plan, or a relationship of subscriber units to geographic zones associated with hazards or activities. For example, a coastal zone may be associated with a tsunami warning. A hazard zone may be a zone known as an earthquake-prone zone, a tornado-prone zone, or a possible gas or chemical leak zone. A zone associated with an activity may, for example, be a zone associated with a search for a suspected perpetrator (i.e., zone of a current active-shooter event).

User interface 156 can be coupled to data analyzer 154 and common-channel single interface 152 for the purpose of capturing user input, or instructions, and delivering such input to these coupled components, and for graphically interpreting and displaying any alert generated in response to synthetic data. User interface 156 and the other components of data analyzer system 150 need not be in the same location; user interface 156 can send user instructions, and receive output for display, at a remote location. User interface 156 can be implemented with a computer, or other terminal, running an Internet browser, or otherwise equipped for receiving user input and displaying the alert of the external event as graphical output on the screen. User input at user interface 156 can be implemented by many known methods of computer interface, such as, menu selections, selections from a displayed map, inputs to a data entry form displayed on a screen, using a pointing device, and the like.

Figure 3:
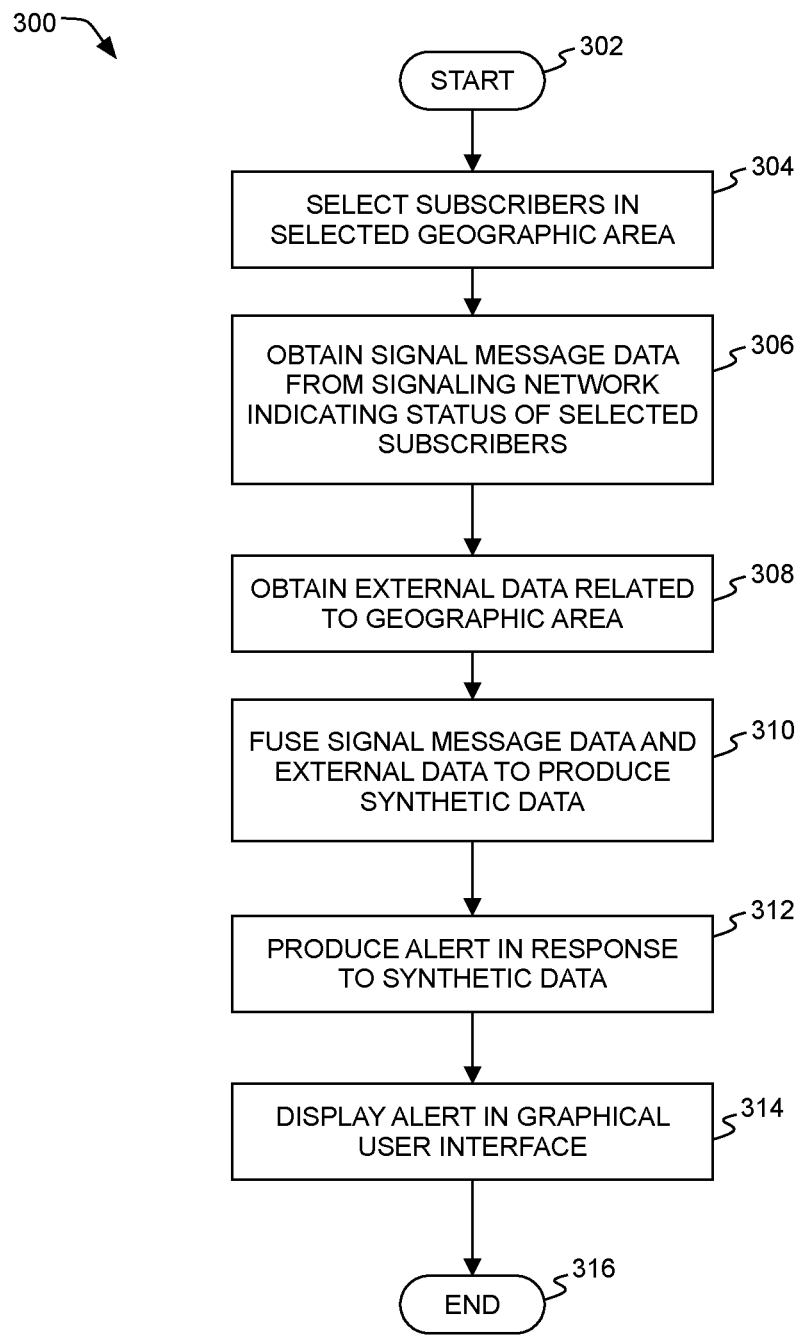
FIG. 3 is a high-level flowchart illustrating a method of detecting or analyzing an event external to a signaling network in accordance with an example embodiment of the present disclosure.

With reference now to FIG. 3, there is depicted a high-level flowchart illustrating an exemplary method of detecting or analyzing an event external to a signaling network in accordance with an example embodiment of the present disclosure. In operation, the apparatus and method of the present disclosure can be controlled by software executed using hardware shown in FIGS. 1 and 2.

As illustrated, method 300 begins at block 302, and thereafter continues at block 304, wherein the method selects a set of intelligent network subscribers in a selected geographic area. In some embodiments, a graphical user interface can be used to select subscribers in an area on a map, which is described in more detail with reference to FIG. 4. In another embodiment, a set of intelligent network subscribers can be selected according to an area code, or those connected to an exchange or central office. In yet another embodiment, a set of subscribers can be selected according to a political boundary, such as the selection of all subscribers in a city, state, or country. Subscribers can be selected as a group, such as those subscribers assigned to a particular call center, or those subscribers supported by a customer call center, or a 911 call center. Other similar means of selecting a set of subscribers maybe used.

After selecting a set of network subscribers, the process obtains signal message data from a signaling network in the intelligent network, which signal message data indicates status of the subscribers in the selected set of subscribers, as illustrated at block 306. In various embodiments, signal message data can be obtained by polling or monitoring signal message data related to selected subscribers. An SS7 communication analyzer can be used to obtain the signal message data, which data can include SS7 cause codes. SS7 cause codes can indicate a subscriber is busy, not busy, not working, has failed to complete a call, and other status supported by SS7 specifications.

Once signal message data has been obtained as depicted at block 306, the process obtains external data related to the selected geographic area, as illustrated in block 308. In various embodiments, external data can include weather data, traffic data, seismic data, tsunami wave data, special event data, disaster or emergency data, population or crowd data, public service infrastructure data, crime incident data, or the like. External data can be obtained via an external network, cloud service, data provider, Internet connection, or the like. External data can be data that is not available using common-channel network signal message protocols for managing, controlling, or troubleshooting the common-channel network. External data can be data collected by agencies, institutions, organizations, academic entities, and the like.

Note that in some embodiments obtaining signal message data in block 306 and obtaining external data in block 308 can be done in reverse order, or simultaneously, or in parallel, wherein the order or timing of obtaining such data is not as important as obtaining the data in a timely manner for a timely analysis or detection of an external event.

After obtaining the external data, the process fuses signal message data and external data to produce synthetic data, as illustrated at block 310. Fusing data can include the process of analyzing data sets in combination to produce new data, or synthetic data, or synthesized data. As shown in FIG. 2, signal message data comes from common-channel signal network 218, and may also come from various databases including baseline data 206, geographic data 208, and recent data 210. External data can come from a database, such as external data 212, that is external to the intelligent network.

Data fusion can be the process of integrating multiple data sources to produce more consistent, accurate, and useful information than that provided by any individual data source. Because synthetic data is derived from multiple data sources, synthetic data can be any data that is not obtained solely by direct measurement of a given situation. In some embodiments, signal message data and external data can represent very different forms of measurement. For example, signal message data can represent the status of a subscriber in a geographic location, and external data can represent weather conditions at the same geographic location. Combining these types of data can be more informative than either set of data considered alone. In other embodiments, such data fusion can be referred to as data integration, which can combine data in diverse data sets into a unified data set. In various embodiments of the disclosure, data fusion can use techniques of data correlation, statistical analysis, spatial analysis, pattern recognition, machine learning, artificial intelligence, neural network tools and analysis, and the like, wherein some, or all of which, may be processed, or aided in processing, by artificial intelligence processor 216.

Signal message data (internal network data) and external data can each provide evidence of the occurrence of an external event. Data fusion can be considered the process of analyzing the evidence derived from internal network data and external data to produce stronger, more reliable, and more accurate evidence of an external event.

With reference now to block 312, the process produces an alert in response to the synthetic data. Such alerting in response to an external event can be in the form of an indication that a particular external event is (or may be) occurring, or has occurred. The alert can also indicate the location of the external event, and a level of confidence in the detection and/or location of the event. An alert can also include a prediction of the progression of the event. Producing the alert can involve techniques that consider selected parameters exceeding a threshold, a degree of correlation of a current pattern with an anticipated or historic pattern, or an output from a neural network trained to recognize evidence of an external event. The alert can be presented in one of many forms understandable by a human or machine. The alert can be data, text (e.g., email or text message), images, or the like. Alerts can also be prioritized based upon the synthetic data, or other relationships between the signal message data and the external data.

Figure 4:
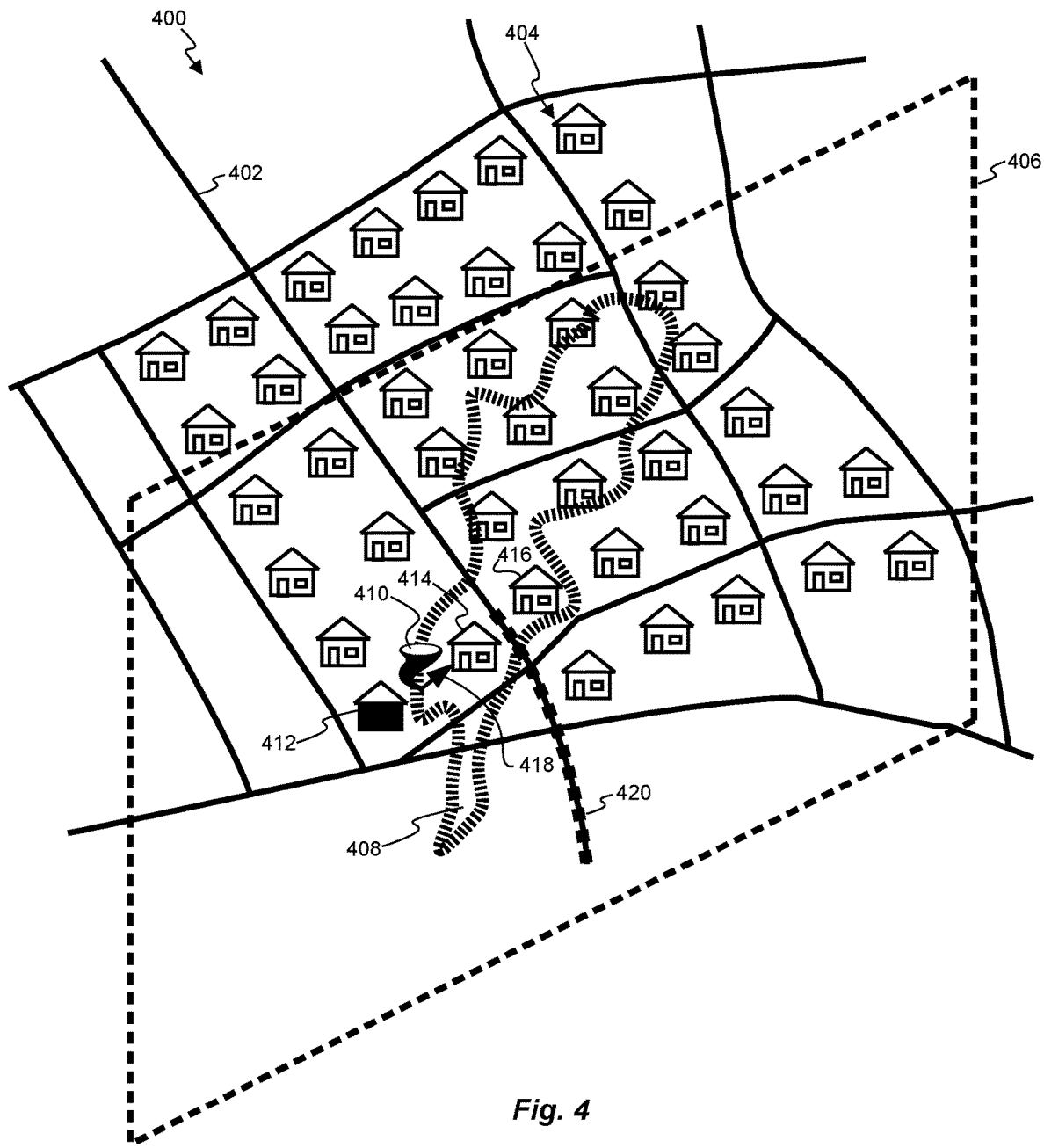
FIG. 4 illustrates a schematic representation of a graphical user interface that can be used in accordance with various aspects of the present disclosure.

After producing the alert, the process can display the alert in a graphical user interface, as depicted in block 314. In some embodiments of the disclosure, the display can use indicators on a map to show the nature of the event, the location of the event, and perhaps a magnitude, ranking, severity, predicted continuation, or confidence in the detection of the external event. FIG. 4 shows one of many possible examples of the display of an alert.

Finally, the process for alerting in response to an external event that is external to the intelligent network ends at block 316.

Referring now to FIG. 4, there is depicted a schematic representation of a graphical user interface that can be used in accordance with an embodiment of the present disclosure. As shown, map 400 represents a city or neighborhood having roads 402 and houses 404. Houses 404 can more generally represent buildings or other structures that contain subscriber premise equipment, such as telephones, fax machines, or other equipment connected to the network (i.e., the PSTN).

In an embodiment that uses weather information as external data, bounding box 406 can represent external weather data, wherein bounding box 406 defines an area of a severe weather watch or warning. Note that the depiction in FIG. 4 can be used to facilitate user input, wherein a similar box can also represent user input, in geographical user interface 156, where such a box can be drawn as an input to select a set of intelligent network subscribers in a selected geographic area, as depicted at block 304 in FIG. 3.

Contour 408 can represent external radar image data, which can indicate the location of boundaries of a current cloud formation in map 400. External weather data can also indicate a suspected location of cloud rotation, or conditions favorable to a tornado, as indicated by tornado symbol 410. Note that contour 408 may indicate a "hook" formation commonly associated with tornadic activity, as shown between houses 412 and 414. Thus, external weather data, and other similar data, may include data produced from an analysis of the external data, such as the likely location of a tornado based on data representing a cloud formation.

House 412, with a blackened rectangle, can be used to indicate the location of a subscriber reporting a cause code message indicating that it is out of service. The fusing of this signal message data with the external data showing a weather watch box and an indication of cloud structures and tornadic activity can lead to the production of synthetic data, and an alert based on the synthetic data, wherein the alert indicates the external event of a tornado on the ground at the location indicated near house 412 and tornado symbol 410. A symbol similar to tornado symbol 410 can graphically indicate the alert on map 400, as described in relation to block 314 in FIG. 3.

Data indicating slow vehicular traffic in the area of house 414 (i.e., a slow traffic area), as shown by dashed road segment 420, can represent further external data supporting the production of the alert indicating an external weather event, such as a tornado and high winds at the location represented by tornado symbol 410. The cause of slow vehicular traffic can be expected to accompany a severe weather event, wherein the slow traffic can be caused by downed trees or damaged vehicles. This is an example of signal message data fused with external data that produces synthesized data of a magnitude and veracity deemed sufficient to produce an alert indicating a high probability of a tornado on the ground at the location of tornado symbol 410.

In other embodiments the disclosure, continued occurrence of the event can be predicted and an alert produced to indicate such a prediction, along with a corresponding graphical indication, as shown by arrow 418. Arrow 418 can show that a suspected tornado will move northeast toward house 414. This information is useful for alerting a population of an imminent danger, and for deploying help and resources to manage the external tornadic event. Data analyzer system 150 can use this prediction ability to anticipate that signal message data from house 414 will soon indicate an outage, which will further confirm and strengthen the veracity of any alerts already produced that indicated a tornado is on the ground near the location of tornado symbol 410 and house 414.

In another embodiment, the system can monitor signal message data related to calls into a 911 call center, and record an originating subscriber's number when that subscriber fails to complete the call due to, for example, all incoming lines to the call center being busy or unavailable. With reference to FIG. 3, the selected subscribers in block 304 can be the subscribers in the geographic area that are assigned to a particular 911 call center. The signal message data obtained in block 306 can include a status code indicating busy or unavailable to the subscriber originating the 911 call.

With reference to block 308, the external data obtained can be a subscriber's name and address obtained from a billing-data external data base, such as a database used for billing information, some of which are available to phone companies, and some of which are available to the public at large. Examples of billing-data external databases are the NPAC (Number Portability Administration Center) and the LERG (Local Exchange Routing Guide) or databases available on websites. Additional external data obtained can be data related to the persons at the address, such as incident or arrest records, sex offender records, weapon ownership records, or the like, which may assist 911 operators in informing or warning the responders that may be dispatched.

Referring to block 310, the signal message data related to a failed or blocked 911 call, and the external data related to the identity, address, and circumstances of the subscriber can be fused to produce synthetic data indicating a possible incident or a likely enhanced need for responders at the subscribers address or location. Additional information incorporated into the synthetic data can indicate the probability, urgency, or severity of any incident, which information may influence any alert issued in response to the synthetic data, as shown at block 312. Thereafter, the any alert produced may be displayed in the graphical user interface, as indicated at block 314.

Synthetic data can also be used to prioritize alerts. With regard to missed or blocked 911 calls, the signal message data related to the blocked 911 caller may be fused with external data (as shown at block 310) in order to produce synthetic data that can be used to prioritize, or rate, blocked callers that should be called back to inquire about any incident that may have precipitated their call. As an example, if 911 calls are initiated and blocked from subscribers 404 and 412 (i.e., the subscribers in houses 404 and 412) in FIG. 4, an alert including a list of 911 calls that need to be returned (i.e., investigated) by the 911 call center can include the blocked 911 call from subscriber 412 ranked as more urgent or important than the blocked 911 call from subscriber 404 because the synthetic data is a product of signal message data and external data that is related to an incident near subscriber 412, and there is no similar incident near subscriber 404. Thus, synthetic data can be influenced by the proximity of an external event detected from the synthetic data, and the severity of the external event. Once sorted and prioritized, an alert in the form of a short message text (e.g., an SMS message) can be sent via the SS7 network to a responsible emergency service provider or 911 call center to provide real-time notice of call attempts from subscribers who may be in need of assistance.

Using various embodiments of the present disclosure, external anomalous or emergency events can be specifically, tracked, measured, or quantified with the assistance of the normal operation of a traditional signaling network, such as the SS7 network. Signal message data related to anomalous events can be gathered from the SS7 network and correlated or combined with data from outside the SS7 network to produce new synthetic data. Such synthetic data can be richer, more actionable, and more useful than data collected from fewer sources (such as weather service data).

Presently preferred embodiments of the disclosure, and many improvements and advantages thereof, have been described herein with particularity. The description includes preferred examples of implementing the disclosure, and these descriptions of preferred examples are not intended to limit the scope of the disclosure. The scope of the disclosure is defined by the following claims.

What is claimed is:

1. A system in an intelligent network, wherein the intelligent network includes switching elements for establishing a payload channel for transferring payload data, and a Signaling System 7 (SS7) network that is logically separated from the payload channel for transferring SS7 message data, wherein the SS7 messaging data is for managing the switching elements, the system for alerting in response to an external event that is external to the SS7 network, the system comprising:
   an SS7 network interface, coupled to the SS7 network, for obtaining the SS7 message data; and
   a data analyzer coupled to the SS7 network interface, wherein the data analyzer includes a data fuser for fusing the SS7 message data with external data that is not available in the SS7 network to produce synthetic data, and for producing an alert associated with the external event in response to the synthetic data, wherein the synthetic data indicates a correlation between the SS7 message data and the external data, and provides evidence regarding the external event.

2. The system of claim 1 wherein the external data includes geographically located environmental data.

3. The system of claim 2 wherein the geographically located environmental data includes weather data.

4. The system of claim 2 wherein the geographically located environmental data includes seismic data.

5. The system of claim 2 wherein the geographically located environmental data includes traffic data.

6. The system of claim 1 further comprising a graphical user interface coupled to the data analyzer for graphically displaying information related to the alert associated with the external event.

7. The system of claim 1 wherein the interface includes an SS7 communications analyzer adapted to poll the SS7 network for SS7 messages.

8. The system of claim 1 wherein the SS7 network interface further comprises an SS7 message monitor for recording transmission of SS7 messages.

9. A method in an intelligent network, wherein the intelligent network includes switching elements for establishing a payload channel for transferring payload data, and a Signaling System 7 (SS7) network that is logically separated from the payload channel for transferring SS7 message data, wherein the SS7 messaging data is for managing the switching elements, the method for alerting in response to an external event that is external to the SS7 network, the method comprising:
   selecting a set of intelligent network subscribers in a selected geographic area;
   obtaining SS7 message data from the SS7 network in the intelligent network, wherein the SS7 message data indicates a status of subscribers in the set of intelligent network subscribers;
   obtaining external data related to the selected geographic area, wherein the external data is not available in the SS7 network;
   fusing the SS7 message data and the external data to produce synthetic data; and
   in response to the synthetic data, producing an alert of the external event, wherein the synthetic data indicates a correlation between the SS7 message data and the external data, and provides evidence regarding the external event.

10. The method of claim 9 wherein the step of obtaining SS7 message data from the SS7 network further comprises polling intelligent network subscribers in the set of intelligent network subscribers using an SS7 network interface coupled to the SS7 network in the intelligent network to obtain SS7 message data.

11. The method of claim 9 wherein the step of obtaining SS7 message data from the SS7 network further comprises monitoring SS7 messages associated with intelligent network subscribers in the set of intelligent network subscribers using an SS7 network interface coupled to the SS7 network in the intelligent network to obtain SS7 message data.

12. The method of claim 9 wherein the step of obtaining external data related to the selected geographic area further comprises obtaining weather data related to the selected geographic area.

13. The method of claim 9 wherein the step of obtaining external data related to the selected geographic area further comprises obtaining traffic data related to the selected geographic area.

14. The method of claim 9 further including the step of displaying the alert of the external event using a graphical user interface.

15. The method of claim 9 wherein the step of fusing the SS7 message data and the external data to produce synthetic data further comprises fusing the SS7 message data and the external data using at least one of data processing methods selected from the group of data correlation methods, data pattern recognition methods, data statistical analysis methods, Bayesian's methods, data spatial analysis methods, data machine learning methods, data artificial intelligence methods, and data neural network methods, to produce synthetic data.

16. A method in an intelligent network for alerting in response to an external event that is external to the intelligent network, the method comprising:
- selecting a set of intelligent network subscribers in a selected geographic area;
- obtaining signal message data from a signaling network in the intelligent network, wherein a portion of the signal message data indicates a status of subscribers in a set of intelligent network subscribers having a call failure to a selected number;
- obtaining external data related to the selected geographic area, wherein the external data is external to the intelligent network;
- fusing the signal message data and the external data to produce synthetic data; and
- in response to the synthetic data, producing an alert including a list of intelligent network subscribers that may need assistance from the set of intelligent network subscribers having a call failure to the selected number.

17. The method of claim 16 further including a step of ranking the list of intelligent network subscribers that may need assistance in response to the synthetic data, wherein the step of obtaining signal message data further comprises obtaining signal message data from a signaling network in the intelligent network, wherein the signal message data indicates a status of a first subscriber having a first location and a second subscriber having a second location, wherein first and second subscribers each have a call failure to a 911 call center;
- wherein the step of obtaining external data further comprises obtaining vehicle traffic data that indicates a slow traffic area in the selected geographic area;
- wherein the synthetic data is affected by the first location being within the slow traffic area and the second location not being within the slow traffic area; and
- wherein the step of ranking the list of intelligent network subscribers that may need assistance in response to the synthetic data further comprises ranking the first subscriber before the second subscriber in the list of intelligent network subscribers that may need assistance in response to the synthetic data.

18. The method of claim 16 wherein the step of selecting a set of intelligent network subscribers in a selected geographic area further comprises selecting a set of intelligent network subscribers associated with a call center.

19. The method of claim 16 wherein the step of obtaining external data related to the selected geographic area, wherein the external data is external to the intelligent network further comprises obtaining external data defining a hazard zone related to a portion of the selected geographic area.

20. The method of claim 19 wherein the step of obtaining external data defining a hazard zone related to a portion of the selected geographic area further comprises obtaining external data defining a tsunami warning area in a portion of the selected geographic area.

21. The method of claim 16 further including a step of sending the ranked list of intelligent network subscribers that may need assistance to the selected number.

* * * * *